United States Patent [19]
Abe et al.

[11]  4,110,308
[45]  Aug. 29, 1978

[54] STABILIZED ETHYLENE-TETRAFLUOROETHYLENE COPOLYMER COMPOSITION

[75] Inventors: Takeshi Abe; Masahiko Ichimura; Makoto Noshiro; Nobuaki Kunii; Yasumichi Ito, all of Yokohama, Japan

[73] Assignee: Ashai Glass Company Ltd., Tokyo, Japan

[21] Appl. No.: 717,688

[22] Filed: Aug. 25, 1976

[30] Foreign Application Priority Data

Aug. 25, 1975 [JP]  Japan .................. 50-102096

[51] Int. Cl.$^2$ .......................... C08K 3/22; C08K 3/06
[52] U.S. Cl. .......................... 260/45.75 C; 260/42.22; 260/42.27; 260/45.7 R
[58] Field of Search .............. 260/45.7 SC, 42.22, 260/42.49, 42.27, 45.7 R; 526/4, 255; 428/421

[56] References Cited

U.S. PATENT DOCUMENTS

| | | | |
|---|---|---|---|
| 2,643,988 | 6/1953 | Walter | 526/4 |
| 2,985,620 | 5/1961 | Honn | 260/45.75 C |
| 3,622,537 | 11/1971 | Needham et al. | 260/45.75 C |
| 3,682,859 | 8/1972 | Taylor et al. | 260/42.22 |
| 3,691,130 | 9/1972 | Logvinenko | 260/42.22 |
| 3,793,287 | 2/1974 | Fitz et al. | 260/42.22 |
| 3,880,798 | 4/1975 | Deem et al. | 260/42.22 |
| 3,893,971 | 7/1975 | Ukihashi et al. | 526/255 |
| 3,929,721 | 12/1975 | Leverett | 260/42.22 |

Primary Examiner—V. P. Hoke
Attorney, Agent, or Firm—Oblon, Fisher, Spivak, McClelland & Maier

[57]  ABSTRACT

Ethylene-tetrafluorethylene copolymer compositions are stabilized against thermal degradation by incorporating therein a small amount of a copper compound.

10 Claims, No Drawings

STABILIZED ETHYLENE-TETRAFLUOROETHYLENE COPOLYMER COMPOSITION

BACKGROUND OF THE INVENTION

1. Field of the Invention

This invention relates to a stabilized ethylene-tetrafluoroethylene copolymer composition which is stabilized against thermal degradation, and more particularly, this invention relates to an ethylene-tetrafluoroethylene copolymer which is stabilized against thermal degradation by addition of a copper compound. This invention also relates to a process for preparing the stabilized compositions.

2. Description of the Prior Art

It is known that ethylene-tetrafluoroethylene copolymers have excellent thermal, chemical, electrical and mechanical properties and are melt-processable. These copolymers are known to be heat resistant thermoplastic resins which have a fluid initiation temperature or a melting point of 260° to 300° C. However, conventional ethylene-tetrafluoroethylene copolymers thermally deteriorate and become colored, brittle and foamed when heated to a temperature higher than the melting point, such as higher than 300° C, for a long period of time. Accordingly, it is necessary to prevent the thermal deterioration of ethylene-tetrafluoroethylene copolymers by preventing a rise of temperature and decreasing the residence time of the thermoplastic resin in a molding apparatus during the conventional operation of injection molding and extrusion molding processes. The thermal deterioration of ethylene-tetrafluoroethylene copolymers worsens in dependence upon the rise in the temperature, especially in an air atmosphere.

On the other hand, in the powder coating method for spray-coating ethylene-tetrafluoroethylene copolymer powders onto a metal substrate, it has been known to employ (1) a method of preheating the substrate at a temperature higher than the melting point of the copolymer to melt and adhere the copolymer powder on it; and (2) a method of electrostatically coating the copolymer powder on the substrate and melting it.

For example, in order to form a coated film having a thickness of 600 micrometers, as required for an anticorrosive lining, by a powder coating method, it is necessary to preheat the substrate to a temperature higher than 340° C, and (1) it is necessary to repeat a baking operation several times in the method (2) because the maximum thickness of layer resulting from one coating is in the range of about 150 to 200 micrometers.

In both methods, it is possible to attain a thick lining when the operation is carried out on a small substrate using a small size test oven while precisely controlling the temperature. However, it is difficult to obtain the desired coated film because of thermal degradation of the resin caused by non-uniform distribution of temperature in the oven and non-uniform thickness of the substrate when the operation is carried out on a large substrate in an industrial oven having a length of several meters.

The inventors have proposed a thermal stabilizing method which involves combining a small amount of α-alumina with the ethylene-tetrafluoroethylene copolymer (U.S. Pat. No. 3,893,971). Although remarkable effects for stabilizing against thermal degradation could be attained by this thermal stabilizing method using α-alumina at relatively low temperatures of about 310° C, it has been difficult to attain satisfactory thermal stabilization at higher temperatures such as about 340° C. Accordingly, it has been difficult to achieve smoothly and advantageously a thick lining in the powder coating method. These disadvantages cause difficulty when the ethylene, tetrafluoroethylene copolymer remains at a high molding temperature for a long residence time in the molding apparatus, when it is locally overheated or when it is molded under a high temperature atmosphere.

SUMMARY OF THE INVENTION

It is an object of the present invention to provide stabilized ethylene-tetrafluorethylene copolymer compositions which are thermally stable near the temperature at which thermal decomposition begins for conventional ethylene-tetrafluoroethylene copolymers.

Another object of the invention is to provide a melt-processable composition comprising ethylene-tetrafluoroethylene which is resistant to thermal degradation at an elevated temperature.

A further object of the present invention is to provide a process for improving the thermal stability of ethylene-tetrafluoroethylene copolymers. These objects of the invention have been attained by intimately admixing a small amount of a copper compound with the ethyl-tetrafluoroethylene copolymer.

DETAILED DESCRIPTION OF THE PREFERRED EMBODIMENTS

The inventors have attempted to achieve the thermal stability of ethylene-tetrafluoroethylene copolymers at a temperature near the thermal decomposing temperature such as about 340° C. As a result, it has been found for the first time that remarkable thermal stability at elevated temperatures can be attained by adding a small amount of a copper compound such as metallic copper, cupric oxide or cuprous oxide to the copolymer. For example, coloration and foaming can be prevented by admixing about 0.5 wt.% of copper oxides with ethylene-tetrafluoroethylene copolymer even though the copolymer is colored and foamed at 340° C in a short period of time without the stabilizer. The composition of the invention has excellent thermal stability and is neither colored nor foamed by exposing it in an air atmosphere at a temperature higher than about 340° C for a long period of time, whereas ethylene-tetrafluoroethylene itself and the compositions thereof with a small amount of α-alumina are colored and foamed under said conditions. Since remarkable effects can be imparted by combining a small amount of the copper compound, the addition of a small amount of the copper compound to the copolymer does not adversely affect the other desirable physical, chemical and electrical properties of the ethylene-tetrafluoroethylene copolymers and the melt-processability of the copolymers. For the invention, suitable copper compounds include metallic copper, cupric oxide, cuprous oxide, cupric nitrate, cupric chloride and copper alloys, e.g., brass. The copper compound is usually converted to the copper oxides at a molding temperature of about 260° to 360° C in the ethylene-tetrafluoroethylene copolymer.

The amount of the copper compound added is that amount effective for thermal stabilization and is usually more than 0.1 ppm and less than 10 wt.%, preferably less than 3 wt.%. A desirable thermal stabilization effect can be attained by adding about 1 ppm or less when the copper compound is uniformly dispersed in the ethylene-tetrafluoroethylene copolymer. In the case of a simple blending operation using a V-shaped mixer, and the like, the amount of the copper compound can be about 0.01 to 10 wt.%, preferably 0.1 to 5 wt.%. When the amount of the copper compound is too high, the thermal stability is not further improved whereas the strength of the composition is decreased. The type of the copper compound used in the invention is not particularly critical; however, it is preferable to optimize the particle size, the specific surface area, the particle distribution and the like of the copper compound in accordance with the desired properties of the copolymer composition. For example, it is preferable to use a copper compound having a relatively small particle diameter which is usually less than 100μm and preferably about 1–50μm. It is also preferable to have a sharp particle distribution. When the size of the copper compound is out of this range, the surface smoothness of the molded product, the uniform compatibility with the ethyl-tetrafluoroethylene copolymer and the mold processability may be deteriorated to some extent. The preferable copper compounds are ones which are easily converted to cupric oxide or cuprous oxide at about 260° to 360° C.

The ethylene-tetrafluoroethylene copolymers used in the invention can be prepared by various well known polymerization methods such as catalytic emulsion polymerization in an aqueous medium; suspension polymerization; catalytic solution polymerization; vapor polymerization; radioactive irradiation polymerization, or the like. The ratio of ethylene to tetrafluoroethylene can be conventionally varied and it is possible to combine a small amount of a comonomer such as propylene, isobutylene, vinyl fluoride, hexafluoropropylene, chlorotrifluoroethylene, acrylic acid, alkyl esters thereof, chloroethyl vinyl ether, perfluorovinyl ether etc. or a desirable modifier. The ratio of ethylene to tetrafluoroethylene in the copolymer may vary over wide limits. For example, the molar ratio of tetrafluoroethylene to ethylene may be from 40/60–70/30, preferably from about 45/55–60/40. It is preferable to use copolymers having a volumetric melt flow rate of 10 – 300mm$^3$/sec., preferably from 20 – 160mm$^3$/sec. The copolymers have excellent heat resistance, chemical resistance, electrical properties, mechanical properties and also mold processability when heat-melted.

Volumetric melt flow rate as used herein is defined as follows: 1 g of a sample of the copolymer is extruded through a nozzle having a diameter of 1 mm and a roundness of 2 mm under a predetermined pressure of 30 kg/cm$^2$ at a predetermined temperature by using a Flow tester. The volume of the molten sample extruded per unit time is given as the volumetric melt flow rate and the unit is mm$^3$/sec. The predetermined temperature can be the temperature range at which the ethylene-tetrafluoroethylene copolymer is moldable; that is, the temperature range between the temperature at which melt flow begins and the temperature at which thermal decomposition begins which is near the temperature at which melt flow begins, i.e., the fluid initiation temperature. The predetermined temperature is selected from 260° to 360° C for ethylene-tetrafluoroethylene copolymers. The temperature used to measure the volumetric melt flow rate is lower than the temperature at which thermal decomposition of the copolymer begins.

It is also possible to add suitable reinforcing agents, fillers, lubricants, pigments or the like to the copolymer composition of the invention in amounts such that the properties of the ethylene-tetrafluoroethylene copolymer are not deteriorated and the effect of thermal stabilization of the copper compound is not prevented. Such additives include glass fibers, carbon fibers, α-alumina and the like. The addition of the additives can improve the surface hardness, mechanical strength, abrasion resistance and other properties of the copolymer composition. The method of addition of the copper compound is not particularly critical; however, it is preferable to employ a method which blends the ethylene-tetrafluoroethylene copolymer, the copper compound etc. in a highly uniform condition. For example, the copper compound etc. may be crushed into particles having a particle diameter and a particle distribution within the aforementioned ranges and mixed with the ethylene-tetrafluoroethylene copolymer or the ethylene-tetrafluoroethylene copolymer may be crushed and mixed or it may be used in a molten state. It is also possible to disperse the ethylene-tetrafluoroethylene copolymer in an aqueous medium or an organic medium and then to mix it with the copper compound by a wet mixing method.

Various methods can be employed for blending the copper compound. For example, commercially available copper oxides or metallic copper powder can be blended with the copolymer in a V-shaped mixer. This is a simple method. In order to decrease the amount of the copper compound used to decrease the coloring caused by the copper compound, it is preferable to use less than 0.1 wt.% of the copper compound. In said case, it is necessary to uniformly disperse the copper compound. In order to uniformly disperse such a small amount of the copper compound, it is effective to support it on a carrier. For example, as disclosed in U.S. Pat. No. 3,893,971, α-alumina itself displays certain effects of thermal stabilization. Accordingly, it is especially effective to support the copper compound on α-alumina. It is also possible to employ the following methods when using a small amount of the copper compound. A small amount of the copper compound is supported on α-alumina and is blended with the ethylene-tetrafluoroethylene copolymer. An aqueous slurry or organic solvent slurry of ethylene-tetrafluoroethylene copolymer or α-alumina is stirred in a mixer with a bearing made of a copper alloy such that the bearing wears so as to incorporate the copper compound.

The mechanism of the effect of the copper compound is not clear but is theorized to be as follows. The copper compound reacts with the oxygen of the air at a mold processing temperature of about 300° C for the ethylene-tetrafluoroethylene copolymer whereby a small amount of copper oxides is produced. The copper oxides may act as a thermal stabilizer. The copper oxides trap hydrofluoric acid which is a decomposition product of the ethylene-tetrafluoroethylene copolymer thereby preventing the activation of hydrofluoric acid as a catalyst for the thermal decomposition of ethylene-tetrafluoroethylene. Moreover, the copper oxides react at the activated points formed by the decomposition of the ethylene-tetrafluoroethylene copolymer. This description is not intended to limit the scope of the invention.

The composition of the invention can be used for preparing various types of molded articles by various processing methods, and can be applied to various applications in various uses. For example, the copolymer composition may be used for press molding, extrusion molding or injection molding or as a lining, a coating, a wire coating, or the like. The optimum ethylene-tetrafluoroethylene copolymers have a temperature at which melt flow begins of about 260°–300° C and a temperature at which thermal decomposition begins of about 320°–360° C. The melting temperature of the copolymer is selected to be between the temperature at which melt flow begins and the temperature at which thermal decomposition begins and is usually from about 260°–360° C. The compositions of this invention have an improved thermal stability, and may most advantageously be used in mold processing processes using a hot melt. For example, an ethylene-tetrafluoroethylene copolymer having a thermal decomposition temperature of about 340° C (without the copper compound) can be improved to prevent coloring and foaming at 340° C for a long period of time by adding 0.1 wt.% of the copper compound. Accordingly, it is possible to heat the composition of this invention at higher temperatures than the copolymer having no copper compound whereby the processability of the mold processing is greatly improved.

Having generally described this invention, a further understanding can be obtained by reference to certain specific examples, which are included for purposes of illustration only and are not intended to be limiting unless otherwise specified.

EXAMPLE 1

100 parts by wt. of an ethylene-tetrafluoroethylene copolymer (having a molar ratio of tetrafluoroethylene to ethylene of 52 to 48, a fluid initiation temperature of 279° C, a temperature at which thermal decomposition begins of 345° C and a volumetric melt flow rate of 46mm³/sec. at 300° C) was admixed with 0.1 part by wt. of cupric oxide having an average particle diameter of 5μm. The resulting composition was press-molded at 300° C to form a sheet. The sheet was exposed to the atmosphere at 340° C for 1.5 hours. No coloring or foaming was observed. On the other hand, when cupric oxide was not admixed, the copolymer immediately developed color and became brown after 0.5 hour with foaming.

EXAMPLES 2 TO 3 AND REFERENCE EXAMPLE

The ethylene-tetrafluoroethylene copolymer of Example 1 (average diameter of 50μm) was admixed with each of the components tested in Table 1 to prepare a series of compositions in a V-shaped mixer. About 2 g of each of the compositions was put on a watch glass and was heat-melted in an electric furnace at 340° C for 1 hour and was cooled to solidify it. The appearance was observed. When the composition was thermally deteriorated, the composition turned brown and was foamed. When the composition was not thermally deteriorated, a smooth coated film of the composition was obtained. In some cases, a slight coloring caused by the added component was observed but it was different from the color caused by the thermal deterioration, whereby it was possible to easily discriminate it. The results are shown in Table 1.

TABLE 1

| | Added Component | Amount(ppm) | Thermal Deterioration |
|---|---|---|---|
| Example 2 | cupric oxide powder (100μ) | 1000 | none |
| Example 3 | metallic copper powder (500μ) | 5000 | none |
| Reference | none | — | brown coloring foaming |
| Reference | ferric oxide (100μ) | 5000 | brown coloring foaming |
| Reference | chromium trioxide powder (100μ) | 5000 | brown coloring foaming |
| Reference | cobalt oxide (100μ) | 5000 | brown coloring foaming |
| Reference | metallic nickel powder (100μ) | 5000 | brown coloring foaming |
| Reference | α-alumina powder (2μ) | 1000 | no foaming but brown coloring |

EXAMPLE 4

10 g of α-alumina having a diameter of 2 micrometers was immersed into 200 ml of 0.1% aqueous solution of cupric nitrate and then, the α-alumina was separated by a filtration and was dried at 400° C for 3 hours to obtain alumina powder supporting about 1000 ppm of a copper component. The powder was added to the ethylene-tetrafluoroethylene copolymer of Example 1 at a ratio of 0.1 wt.% (about 1 ppm) of the copolymer. The composition was tested by the thermal stability test of Example 2. No deterioration was found.

EXAMPLE 5

In accordance with the process of Example 4 except using cupric chloride instead of cupric nitrate, the test was carried out. No deterioration was found.

EXAMPLE 6

In a container made of stainless steel, 30 wt. parts of the ethylene-tetrafluoroethylene copolymer of Example 1 and 100 wt. parts of perchloroethylene were charged and the mixture was blended for 100 hours in a homomixer equipped with a bearing made of an alloy of 90% of copper and 10% of tin. The copolymer composition was separated from the slurry by filtration and was dried at 150° C for 1 day. The copolymer composition was tested by the thermal stability test of Example 2. No deterioration was found. The copolymer composition was washed with nitric acid to extract cupric ions. The content of copper in the copolymer composition was 0.8 ppm.

EXAMPLE 7

An ethylene-tetrafluoroethylene copolymer (having a molar ratio of tetrafluoroethylene to ethylene of 53 to 47 and a small amount of hexafluoropropylene)(volumeric melt flow rate of 96 mm³/sec. at 300° C) was admixed by kneading with 0.05 wt.% of cupric oxide having an average particle diameter of 2 micrometers. The resulting composition was press-molded at 300° C to form a sheet. The sheet was exposed to the atmosphere at 340° C for 1.5 hours. No coloring or foaming was observed.

What is claimed as new and desired to be secured by Letters Patent of the United States is:

1. An ethylene-tetrafluoroethylene copolymer composition having improved thermal stability which comprises an ethylene-tetrafluoroethylene copolymer wherein said copolymer comprises from 30 to 60 mole % of tetrafluoroethylene units, and from 0.1 ppm to 10 wt.% of a copper compound based on the weight of the copolymer and wherein said copper compound is copper, copper oxide, or a compound which is converted to copper oxide by heating in air at the molding temperature of said copolymer.

2. The composition of claim 1, wherein the copper compound is copper or a compound which is converted to copper oxide by heating in air.

3. The composition of claim 1, wherein the copper compound is supported on a carrier.

4. The composition of claim 1, wherein the copper compound is supplied by the wearing of a copper alloy machine element during the processing of said copolymer.

5. The composition of claim 1, wherein the copper compound is added together with α-alumina.

6. The composition of claim 1, wherein the copolymer comprises from about 30 to 60 mole percent of ethylene units and from about 40 to 70 mole percent of tetrafluoroethylene units.

7. The composition of claim 1, wherein the copolymer has a volumetric melt flow rate of about 10 – 300mm$^3$/sec.

8. The composition of claim 1, wherein the copolymer has a flow initiation temperature of 260°–300° C and a thermal decomposition temperature of 320°–360° C.

9. The composition of claim 5, wherein the α-alumina has an average particle diameter of less than 100μm.

10. The composition of claim 1, wherein the amount of the copper compound is from 0.1 ppm to 0.1 wt% and the copper compound is uniformly dispersed in the copolymer.

* * * * *